United States Patent
Kimura et al.

(10) Patent No.: US 9,219,262 B2
(45) Date of Patent: Dec. 22, 2015

(54) ASSEMBLED BATTERY AND VEHICLE

(75) Inventors: Kenji Kimura, Toyota (JP); Kosuke Kusaba, Inazawa (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 101 days.

(21) Appl. No.: 14/111,934

(22) PCT Filed: Apr. 28, 2011

(86) PCT No.: PCT/JP2011/002500
§ 371 (c)(1),
(2), (4) Date: Oct. 15, 2013

(87) PCT Pub. No.: WO2012/147134
PCT Pub. Date: Nov. 1, 2012

(65) Prior Publication Data
US 2014/0045038 A1   Feb. 13, 2014

(51) Int. Cl.
*H01M 2/10*   (2006.01)
*H01M 2/20*   (2006.01)
*H01M 2/04*   (2006.01)
*H01M 2/30*   (2006.01)

(52) U.S. Cl.
CPC ............ *H01M 2/1077* (2013.01); *H01M 2/043* (2013.01); *H01M 2/206* (2013.01); *H01M 2/30* (2013.01); *H01M 2220/20* (2013.01)

(58) Field of Classification Search
CPC ..... H01M 2/1077; H01M 2/206; H01M 2/30; H01M 2/043; H01M 2220/20
See application file for complete search history.

(56) References Cited

U.S. PATENT DOCUMENTS

| | | | |
|---|---|---|---|
| 6,379,837 B1 | 4/2002 | Takahashi et al. | |
| 6,410,184 B1* | 6/2002 | Horiuchi et al. | 429/156 |
| 2001/0031393 A1 | 10/2001 | Oda et al. | |
| 2005/0260487 A1* | 11/2005 | Kim et al. | 429/81 |
| 2009/0111015 A1* | 4/2009 | Wood et al. | 429/164 |
| 2011/0014512 A1* | 1/2011 | Amagai et al. | 429/159 |
| 2011/0076543 A1 | 3/2011 | Ro | |
| 2011/0104958 A1* | 5/2011 | Kwon et al. | 439/816 |
| 2012/0135293 A1* | 5/2012 | Gu et al. | 429/156 |

FOREIGN PATENT DOCUMENTS

| | | |
|---|---|---|
| CA | 2614150 A1 | 3/2007 |
| JP | 2000-306564 A | 11/2000 |
| JP | 2001-345088 A | 12/2001 |
| JP | 2009-146692 A | 7/2009 |
| JP | 2010-015952 A | 1/2010 |

* cited by examiner

*Primary Examiner* — Muhammad Siddiquee
(74) *Attorney, Agent, or Firm* — Sughrue Mion, PLLC

(57) ABSTRACT

An assembled battery including a plurality of cells of cylindrical shape arranged in a plane including a diameter direction, each of the cells including a groove portion extending in a circumferential direction, and a fixing plate including an engagement portion engaging with each of the groove portions of the cells to fix the plurality of cells. A bus bar electrically connecting terminal electrodes of adjacent two of the cells may be fixed to the fixing plate.

7 Claims, 8 Drawing Sheets

ASSEMBLED BATTERY AND VEHICLE

CROSS REFERENCE TO RELATED APPLICATIONS

This application is a National Stage of International Application No. PCT/JP2011/002500 filed Apr. 28, 2011, the contents of all of which are incorporated herein by reference in their entirety.

TECHNICAL FIELD

The present invention relates to an assembled battery and the like including a plurality of cells of cylindrical shape connected to each other.

BACKGROUND ART

A battery including a plurality of cells connected electrically to each other is known as a driving power source or an auxiliary power source for an electric car, a hybrid car and the like. Patent Document 1 has disclosed a fixing structure in which a module case having a battery housing portion formed therein is provided with a number of terminal openings, and adhesive filling holes and adhesive flowing portions associated therewith, and an adhesive introduced through the adhesive filling hole flows to the terminal opening through the adhesive flowing portion to bond and fix an end portion of a cylindrical cell housed in the battery housing portion to a peripheral wall of the opening.

PRIOR ART DOCUMENTS

Patent Documents

[Patent Document 1] Japanese Patent Laid-Open No. 2000-306564
[Patent Document 2] Japanese Patent Laid-Open No. 2009-146692

DISCLOSURE OF THE INVENTION

Problems to be Solved by the Invention

It is an object of the present invention to suppress the displacement of a plurality of cells of cylindrical shape constituting an assembled battery.

Means for Solving the Problems

To solve the problem, the present invention provides (1) an assembled battery including a plurality of cells of cylindrical shape arranged in a plane including a diameter direction, each of the cells including a groove portion extending in a circumferential direction, and a fixing plate including an engagement portion engaging with each of the groove portions of the cells to fix the plurality of cells, wherein the cell includes a case of cylindrical shape and a power-generating element housed in the case, and wherein the groove portion is a protruding portion protruding inward in the case, and a gasket insulating one terminal electrode from the other terminal electrode is located at the protruding portion in the case.

(2) In the configuration of (1) described above, a bus bar electrically connecting terminal electrodes of adjacent two of the cells can be fixed to the fixing plate. With the configuration of (2), the bus bar can be fixed to the fixing plate to which the plurality of cells are fixed, thereby avoiding a poor connection between the terminal electrodes and the bus bar.

(3) In the configuration of (2) described above, the bus bar is formed in a flat plate shape and includes a plurality of weld portions, each of the terminal electrodes of the plurality of cells being welded to a different one of the weld portions. With the configuration of (3), since the terminal electrodes are connected to the one bus bar of flat plate shape, the operation of connecting the bus bar is simplified as compared with the connection of separate bus bars for adjacent terminal electrodes.

(5) In the configuration of (1) to (3) described above, the groove portion can be formed in the terminal electrode.

(6) In the configuration of (1) to (3) and (5) described above, the fixing plate includes a plurality of fixing plate opening portions, each of the plurality of cells being inserted into a different one of the plurality of fixing plate opening portions, and each of the cells is inserted into the different one of the fixing plate opening portions to engage the groove portion with the engagement portion. With the configuration of (6), the simple insertion of the cell into the fixing plate opening portion can easily fix the cell to the fixing plate.

(7) In the configuration of (6) described above, the engagement portion may be an elastically deformable hook portion protruding from a face of the fixing plate, the plurality of cells being placed on the face. With the configuration of (7), the hook portion can engage with the groove portion to suppress the displacement of the cell in its longitudinal direction. In addition, a friction force can act between the hook portion and the groove portion to suppress the rotation of the cell around its axis.

(8) In the configuration of (7) described above, the hook portion can include at least three hook portions along a circumferential direction of the fixing plate opening portion, and the adjacent hook portions in the circumferential direction can be disposed at generally equal intervals. With the configuration of (8), the displacement of the cell can be suppressed more effectively.

(9) In the configuration of (6) described above, the engagement portion may be an elastically deformable hook portion formed on an inner face of the fixing plate opening portion and extending along a circumferential direction of the fixing plate opening portion. With the configuration of (9), the hook portion can engage with the groove portion to suppress the displacement of the cell in the longitudinal direction. In addition, a friction force can act between the hook portion and the groove portion to suppress the rotation of the cell around the axis.

(10) The assembled battery of (1) to (3) and (5) to (9) described above can be mounted on a vehicle. The displacement of the cell can be suppressed when the assembled battery is subjected to vibrations during running of the vehicle.

(11) In the configuration of (3) described above, each of the weld portions may be cantilevered at an end portion in a direction of a plane including the bus bar.

(12) The assembled battery according to (11) described above can be mounted on a vehicle.

Advantage of the Invention

According to the present invention, the displacement of the plurality of cells of cylindrical shape constituting the assembled battery can be suppressed.

MODE FOR CARRYING OUT THE INVENTION

Embodiment 1

Figure 1:
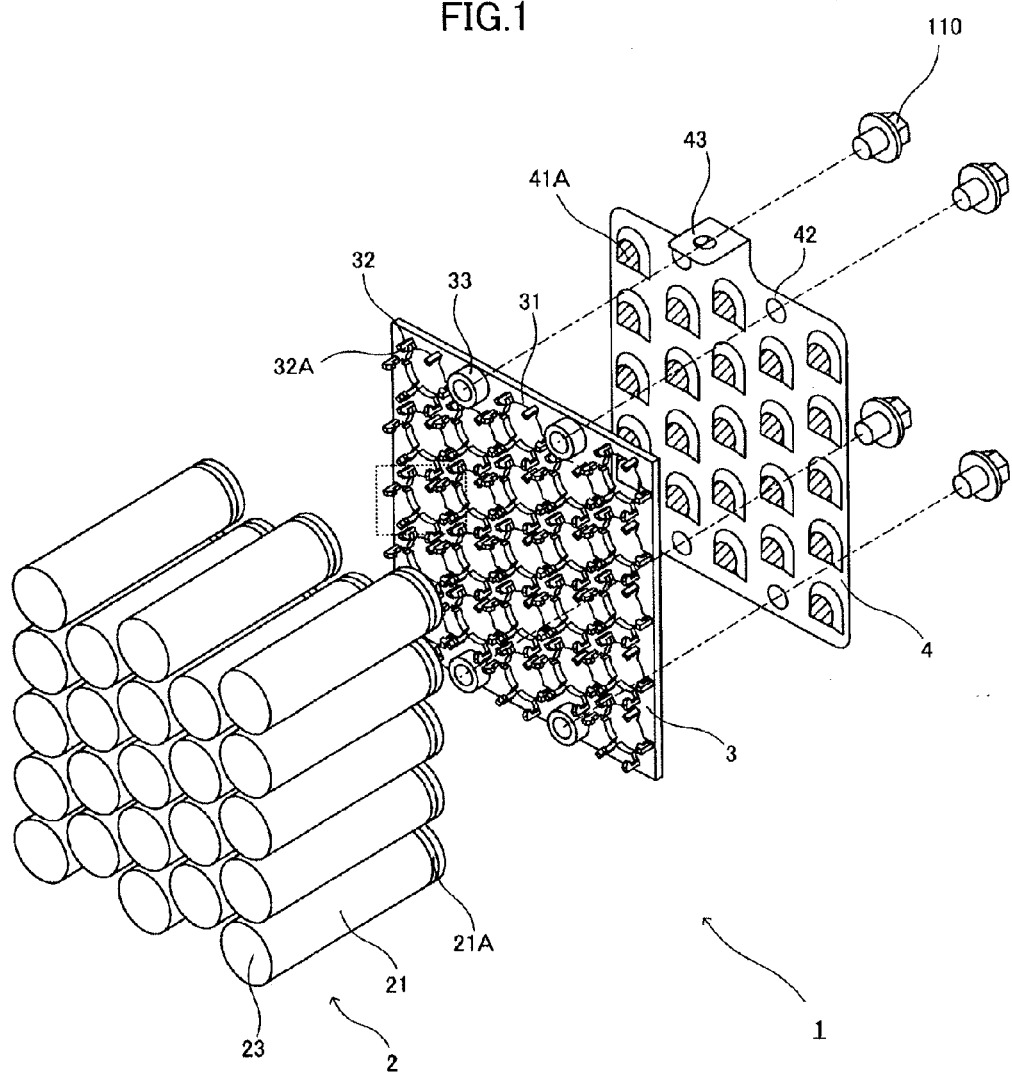
FIG. 1 An exploded perspective view of an assembled battery.
Figure 2:
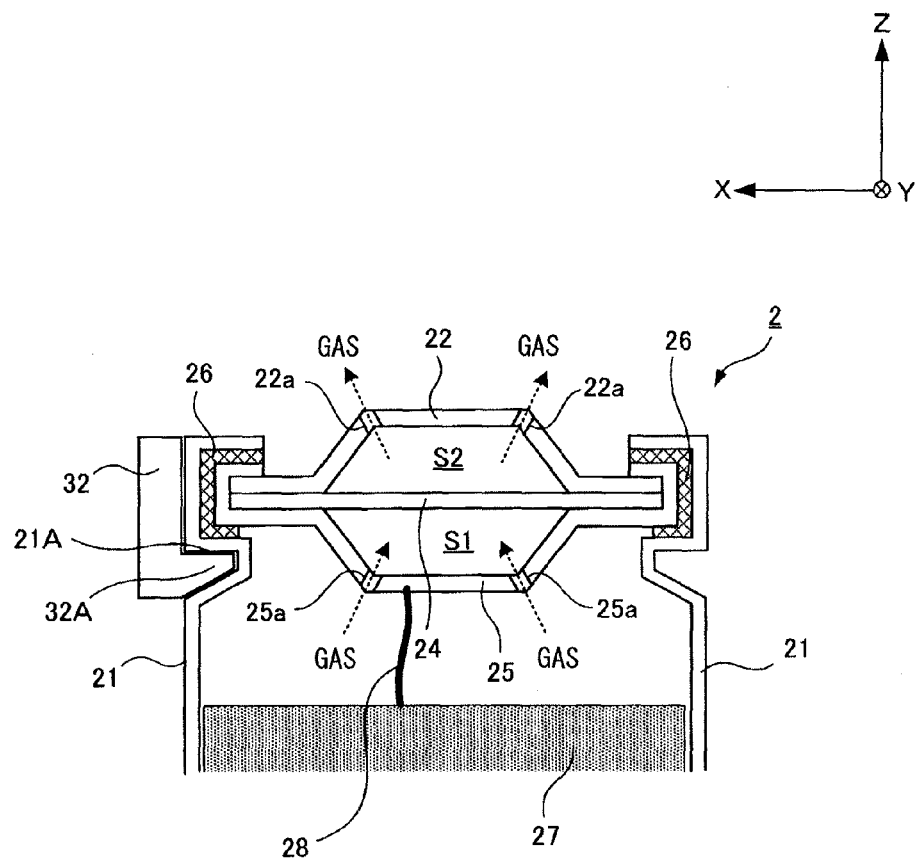
FIG. 2 A section view of a portion of a cell in which a hook portion engages with a protruding portion of the cell.

An assembled battery according to the present embodiment will hereinafter be described with reference to the drawings. FIG. 1 is an exploded perspective view of the assembled battery. FIG. 2 is a section view showing a portion of a cell in which a hook portion engages with a protruding portion formed on the cell by protruding an outer peripheral face thereof inward. The protruding portion is viewed as a groove portion when viewed from the outside of the cell. The assembled battery 1 includes a plurality of cells 2, a fixing plate 3, and a bus bar 4. The cell 2 is a battery of cylindrical shape. The plurality of cells 2 are arranged in a plane including the diameter direction of the cells 2. The cell 2 includes a battery case 21, a positive electrode terminal 22, a negative electrode terminal 23, and a power-generating element 27. The power-generating element 27 is housed in the battery case 21. The power-generating element 27 includes a positive electrode element, a negative electrode element, and a separator disposed between the positive electrode element and the negative electrode element. The separator is impregnated with an electrolytic solution. The cell 2 may be a secondary battery such as a nickel metal hydride battery or a lithium-ion battery. The assembled battery 1 can be mounted as a driving power source or an auxiliary power source on a vehicle such as a hybrid car or an electric car.

A valve plate 24 is sandwiched between the positive electrode terminal 22 and a sealing plate 25. An outer edge of the sealing plate 25 holds an outer edge of the positive electrode terminal 22 and an outer edge of the valve plate 24 therein. The sealing plate 25 is provided for closing an opening portion of the battery case 21, and a gasket 26 is placed between the sealing plate 25 and the battery case 21. This hermetically seals the cell 2.

The gasket 26 is made of an insulating material and insulates the positive electrode terminal 22 and the battery case 21. The insulating material may be a resin. The battery case 21 has the protruding portion 21A protruding inward in the diameter direction formed on the outer peripheral face. The protruding portion 21A extends all around the battery case 21. A portion of the gasket 26 is located on the protruding portion 21A in the battery case 21. An end portion of the sealing plate 25 (end portion in an X axis direction) is provided at the position overlying the protruding portion 21A when viewed from a Z axis direction. Thus, the positive electrode plate 22, the valve plate 24, and the sealing plate 25 can be supported on the protruding portion 21A.

The battery case 21 is used as the negative electrode terminal 23. The sealing plate 25 has a gas path 25a passing therethrough, and the positive electrode terminal 22 has a discharge port 22a passing therethrough. The sealing plate 25 and the power-generating element 27 are connected to each other through a lead 28. This allows the power supplied by the power-generating element 27 to be output through the positive electrode terminal 22.

When gas is produced from the power-generating element 27, the gas passes through the gas path 25a into a space S1 formed between the sealing plate 25 and the valve plate 24. When the internal pressure of the cell 2 reaches the operating pressure of the valve plate 24, the valve plate 24 is broken to cause the gas to move into a space S2 formed between the positive electrode terminal 22 and the valve plate 24. After the movement into the space S2, the gas is discharged to the outside of the cell 2 through the discharge port 22a formed in the positive electrode terminal 22.

Figure 3:
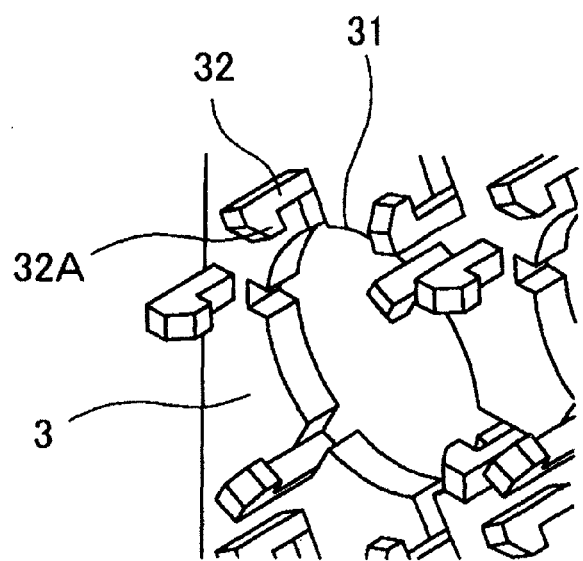
FIG. 3 An enlarged view of an area of a fixing plate indicated by a dotted line in FIG. 1.

Next, the hook portion is described in detail with reference to FIG. 1 to FIG. 3. FIG. 3 is an enlarged view of an area of the fixing plate indicated by a dotted line in FIG. 1. The fixing plate 3 has a fixing plate opening portion 31 at the position opposite to each of the cells 2. The fixing plate opening portion 31 is formed in a generally circular shape when viewed from the direction of the thickness of the fixing plate 3. The fixing plate 3 has, on its one face, the hook portion 32 formed to protrude toward the cell 2. The hook portion 32 has, on its tip, a protrusion 32A formed to protrude toward the fixing plate opening portion 31 when viewed from the longitudinal direction of the cell 2.

A plurality of fastening hole portions 33 are formed at the positions in the fixing plate 3 excluding the positions of the fixing plate opening portions 31 and the hook portions 32. Two fastening hole portions 33 are provided at each end portion of the fixing plate 3. The fastening hole portion 33 is formed to have a thickness larger than that of the fixing plate 3 in the thickness direction of the fixing plate 3. The fixing plate 3 may be made of an insulating resin. When the fixing plate 3 is made of such a resin, the hook portion 32, the fixing plate opening portion 31 and the like can be formed with injection molding. This can simplify the manufacture of the fixing plate 3 of complicated shape.

The bus bar 4 is formed in a flat plate shape, and has, in its area opposite to the cells 2, a plurality of weld portions 41A formed thereon to which the associated positive electrode terminals 22 are to be welded. The weld portion 41A is cantilevered at an end portion thereof in the direction of a plane including the bus bar 4. The bus bar 4 has insertion opening portions 42 formed therein for inserting fastening bolts 110. The insertion opening portion 42 is opposite to the fastening hole portion 33 in the fixing plate 3. The fastening bolt 110 is inserted through the insertion opening portion 42 and is fastened to the fastening hole portion 33 to bring the plurality of cells 2, the fixing plate 3, and the bus bar 4 together. A general positive terminal 43 is formed at an upper end portion of the bus bar 4.

Figure 4:
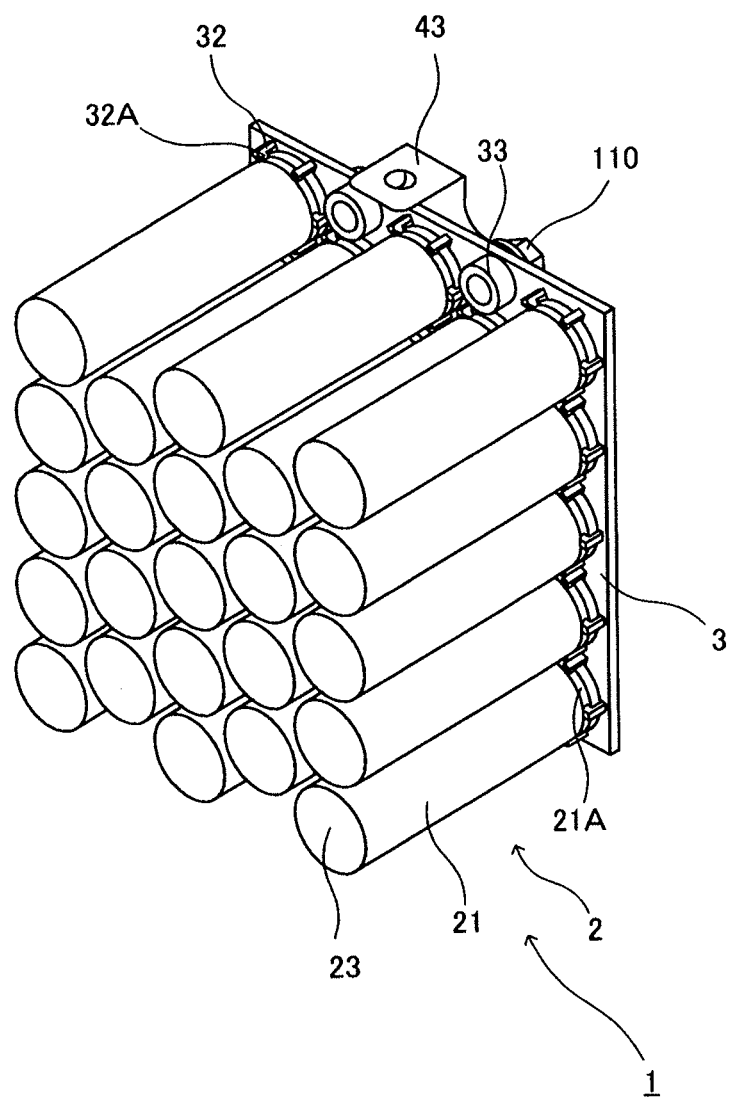
FIG. 4 A diagram showing the assembled battery after the assembly is completed.
Figure 5:
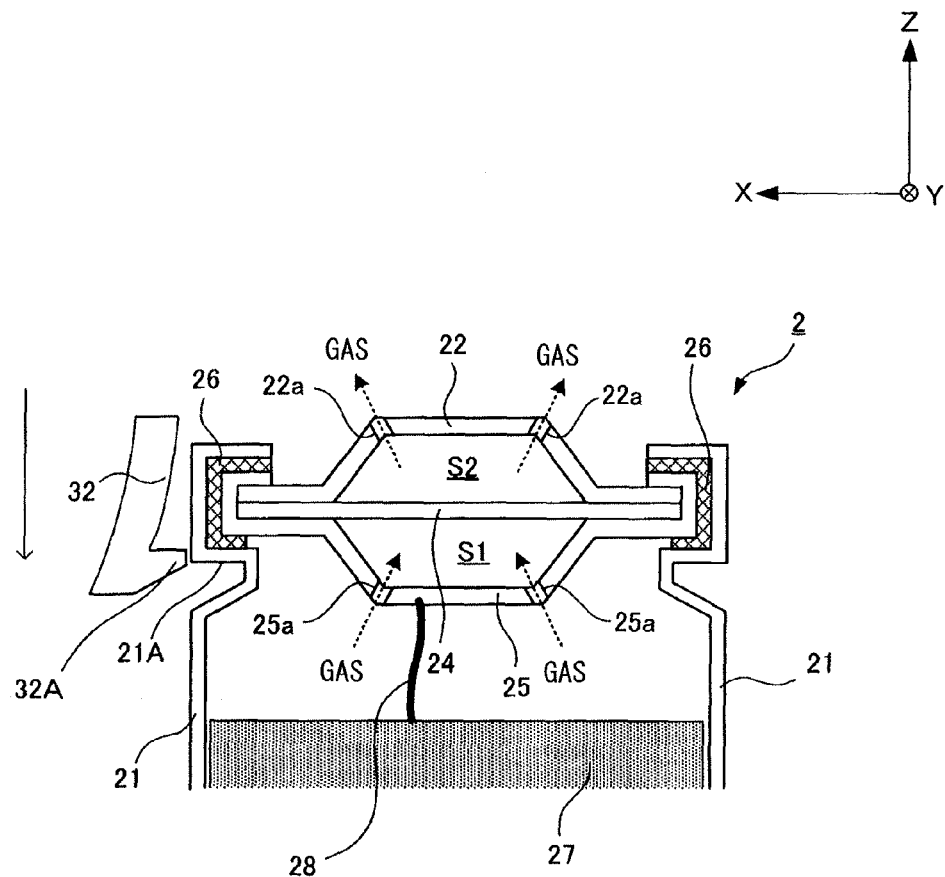
FIG. 5 A diagram for explaining the operation of the hook portion in fixing the cell to the fixing plate.

Next, description is made of how to assemble the assembled battery with reference to FIG. 2, FIG. 4, and FIG. 5. FIG. 4 is a diagram showing the assembled battery after the assembly is completed. FIG. 5 corresponds to FIG. 2 and is a diagram for explaining the operation of the hook portion in fixing the cell to the fixing plate. When the cell 2 is pushed to the fixing plate opening portion 31 in the fixing plate 3, the hook portion 32 abuts on an end portion of the cell 2 in the diameter direction and is elastically deformed away from the fixing plate opening portion 31 as shown in FIG. 5. When the cell 2 is further pushed, the hook portion 32 is slid along an outer face of the battery case 21 and engages with the protruding portion 21A. Thus, with the configuration of the present embodiment, the simple insertion of the cell 2 into the fixing plate opening portion 31 can easily engage the protruding portion 21A with the hook portion 32, thereby fixing the cell 2 easily. When the cell 2 is subjected to vibrations in the longitudinal direction, the hook portion 32 abuts on a wall face of the protruding portion 21A to limit the displacement of the cell 2. When the cell 2 is subjected to a force around the axis, a friction force acts between the protruding portion 21A and the hook portion 32 to suppress the rotation of the cell 2 around the axis. This can avoid a poor connection between the cell 2 and the bus bar 4.

The protruding portion 21A can have both the function as a fixing portion for fixing the cell 2 and the function as a mount portion for mounting the gasket 26. This can simplify the fixing structure to reduce the cost.

Preferably, at least three hook portions 32 are provided along the circumferential direction of the fixing plate opening portion 31, and the adjacent hook portions 32 are spaced at equal intervals (including errors). This can suppress the displacement of the cell 2 more effectively. In the present embodiment, six hook portions 32 are formed around the fixing plate opening portion 31, and the equal intervals are set between the adjacent hook portions 32.

Returning to the description of how to assemble the assembled battery, the bus bar 4 is located at the position where the fixing plate 3 should be attached, and then the fastening bolt 110 is inserted and fastened through the insertion opening portion 42 and the fastening hole portion 33. This brings the plurality of cells 2, the fixing plate 3, and the bus bar 4 together to abut each of the positive electrode terminals 22 of the cells 2 on the associated weld portion 41A. Next, each of the positive electrode terminals 22 and the associated weld portion 41A are bonded by welding. This connects the plurality of cells 2 electrically in parallel, so that the assembled battery with a high electric storage capacity can be provided. Since the bus bar 4 for connecting the plurality of cells 2 is formed of the single plate material, the attachment of the bus bar 4 can be facilitated. In addition, since the bus bar 4 is welded with the plurality of cells 2 positioned in the associated fixing plate opening portions 31, a poor connection between the cell 2 and the bus bar 4 can be avoided.

The weld portion 41A has the cantilevered structure and is deformable in the longitudinal direction of the cell 2. Thus, the dimensional errors of the cell 2 or the like can be accommodated.

The negative electrode terminal 23 is connected to a bus bar having the same shape as that of the bus bar 4 used for connecting the positive electrode terminal 22. This can facilitate the attachment of the bus bar 4.

Embodiment 2

Figure 6:
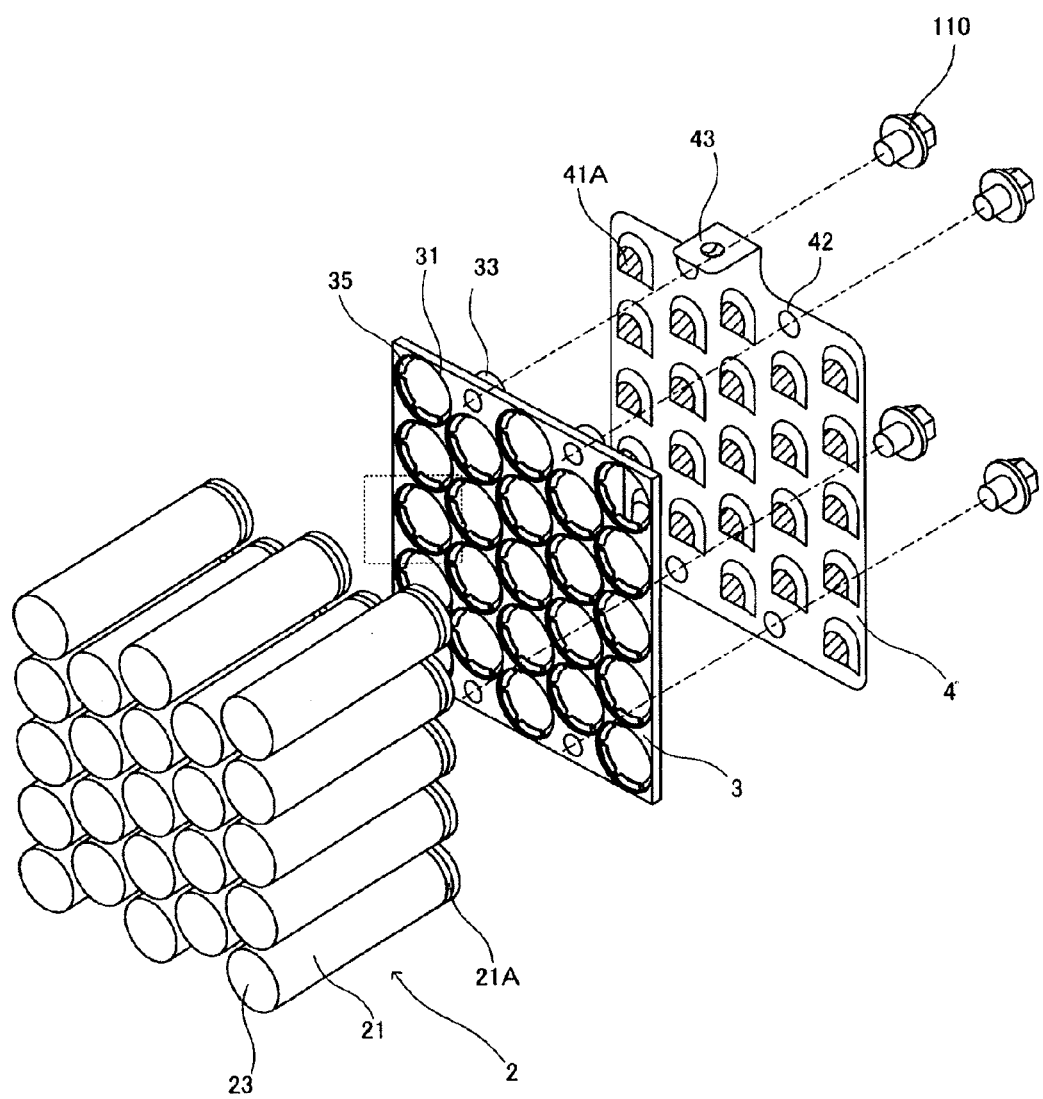
FIG. 6 An exploded perspective view of an assembled battery according to Embodiment 2.
Figure 7:
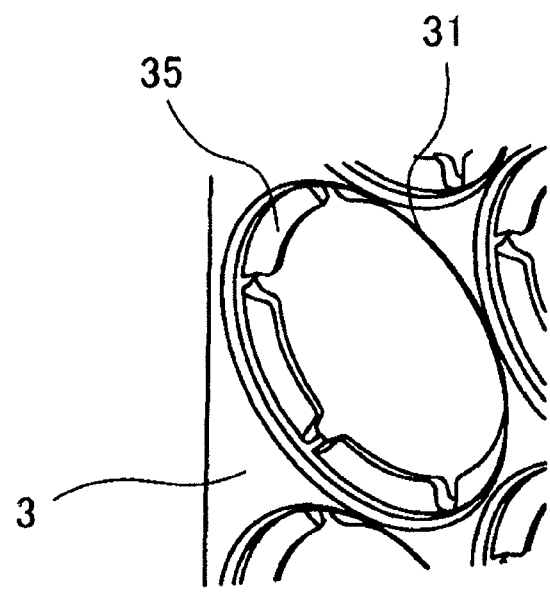
FIG. 7 An enlarged view of an area of a fixing plate indicated by a dotted line in FIG. 6.

Embodiment 2 differs from Embodiment 1 in the shape of a hook portion. FIG. 6 is an exploded perspective view of an assembled battery according to the present embodiment. FIG. 7 is an enlarged view of an area of the assembled battery in FIG. 6 that is surrounded by a dotted line. A hook portion 35 is formed on an inner face of a fixing plate opening portion 31. A plurality of hook portions 35 are formed in the circumferential direction of the fixing plate opening portion 31, and the adjacent hook portions 35 are spaced at equal intervals. The other configurations are identical to those of Embodiment 1 and the description thereof is omitted.

When a cell 2 is pushed to the fixing plate opening portion 31 in a fixing plate 3, the hook portion 35 abuts on an edge of the cell 2 in a diameter direction and is elastically deformed away from the fixing plate opening portion 31. When the cell 2 is further pushed, the hook portion 35 is slid along an outer face of a battery case 21 and engages with a protruding portion 21A. Thus, with the configuration of the present embodiment, the simple insertion of the cell 2 into the fixing plate opening portion 31 can easily engage the protruding portion 21A with the hook portion 35, thereby fixing the cell 2 easily. When the cell 2 is subjected to vibrations in the longitudinal direction, the hook portion 35 abuts on a wall face of the protruding portion 21A to limit the displacement of the cell 2. When the cell 2 is subjected to a force around the axis, a friction force acts between the protruding portion 21A and the hook portion 35 to suppress the rotation of the cell 2 around the axis. This can avoid a poor connection between the cell 2 and a bus bar 4.

The protruding portion 21A can have both the function as a fixing portion for positioning the cell 2 and the function as a mount portion for mounting a gasket 26. This can simplify the fixing structure to reduce the cost.

Preferably, at least three hook portions 35 are provided along the circumferential direction of the fixing plate opening portion 31, and the adjacent hook portions 35 are spaced at equal intervals (including errors). This can suppress the displacement of the cell 2 more effectively. In the present embodiment, six hook portions 35 are formed around the fixing plate opening portion 31, and the equal intervals are set between the adjacent hook portions 35.

Embodiment 3

Figure 8:
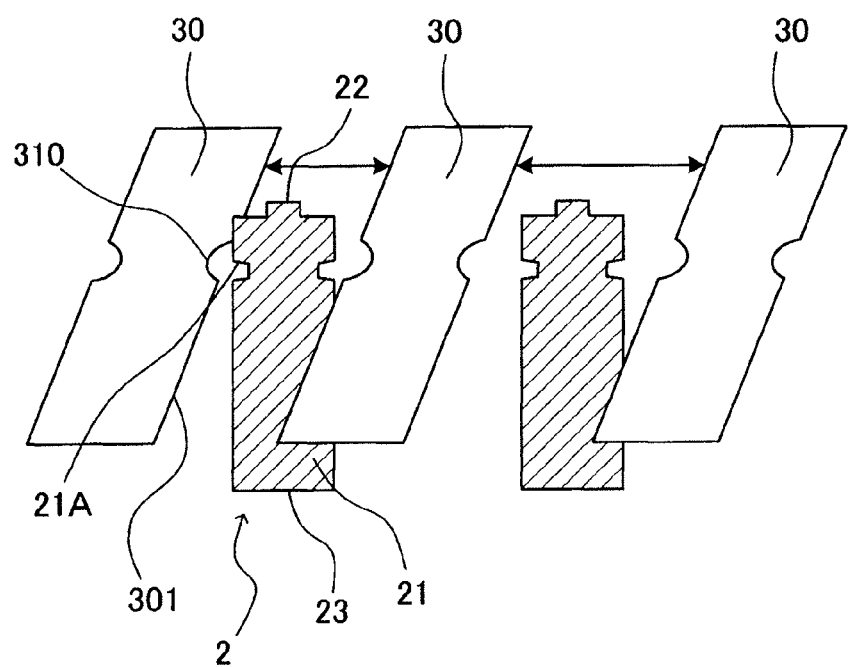
FIG. 8 A diagram showing how to fix cells according to Embodiment 3.

Embodiment 3 differs from Embodiment 1 and Embodiment 2 in that a fixing plate opening portion engages with a protruding portion of a case. FIG. 8 shows how to fix a cell according to Embodiment 3. A divided fixing plate 30 is formed in a rectangular shape, and a side wall portion 301 thereof has a pair of fixing plate opening portions 310 formed therein in a semicircular shape. The side wall portions 301 of the adjacent divided fixing plates 30 are connected to each other to engage the fixing plate opening portion 310 with a protruding portion 21A. The divided fixing plates 30 are bonded together to constitute a fixing plate 3. The configuration of the present embodiment can achieve the same advantages as those of Embodiments 1 and 2 described above. Since the hook portion is not required as compared with Embodiments 1 and 2, the structure can be simplified. The fixing plate opening portion 310 may have other shapes than the semicircle. The other shapes may include a rectangle, a trapezoid and the like.

Modification 1

Figure 9:
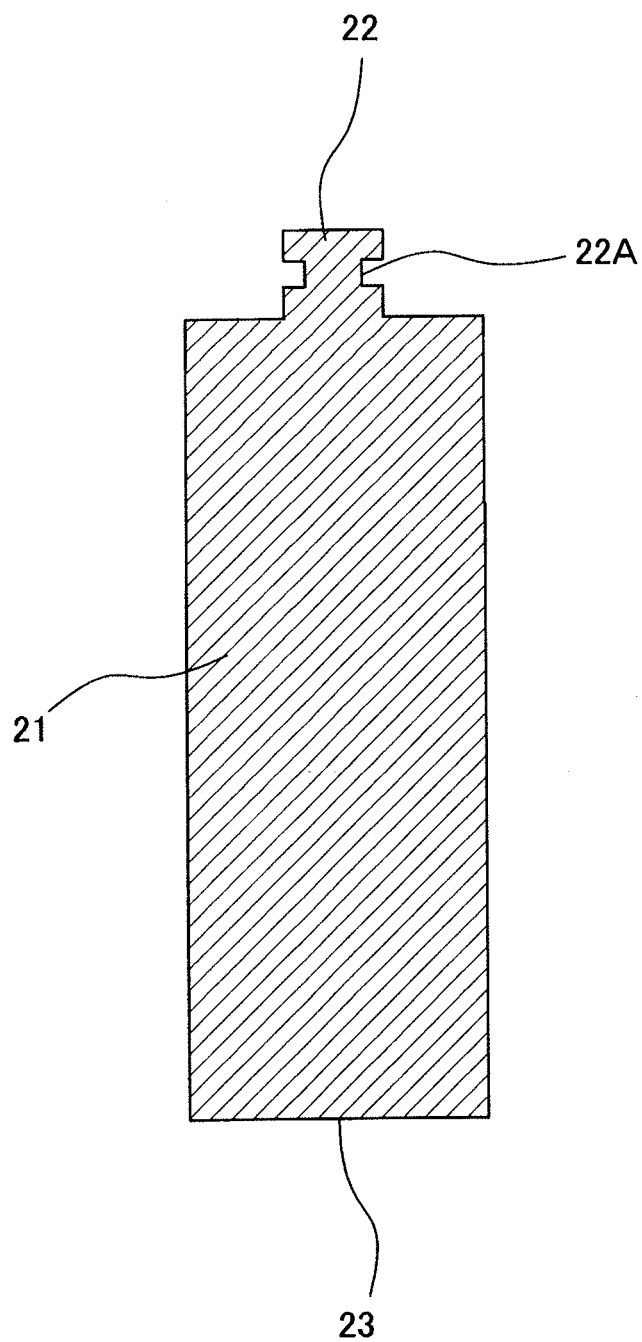
FIG. 9 A section view of the cell according to Modification 1.

Although each of the embodiments described above includes the protruding portion formed on the outer face of the case, the present invention is not limited thereto, and the protruding portion may be provided at other positions. As shown in FIG. 9, the other positions may include the positive electrode terminal 22 of the cell 2. The protruding portion (groove portion) formed in the positive electrode terminal 22 can engage with the hook portion 32 in Embodiment 1, the hook portion 35 in Embodiment 2, or the fixing plate opening portion 310 in Embodiment 3 to achieve the same advantages as those in each of Embodiments described above. The other positions may include a position of the battery case 21 closer to the negative electrode terminal 23. The other positions may include both positions of the battery case 21 closer to the positive electrode terminal 22 and the negative electrode terminal 23.

Modification 2

Although each of the embodiments described above includes the protruding portion 21A extending all around the battery case 21, the present invention is not limited thereto. For example, the protruding portion 21A may be formed only at the position of the engagement of the hook portion 32 or the hook portion 35. This can accomplish the same advantages as those in each of the embodiments described above. In Modification 1, the protruding portion 22A may be formed only at the position of the engagement of the hook portion 32 or the hook portion 35.

Modification 3

Figure 10:
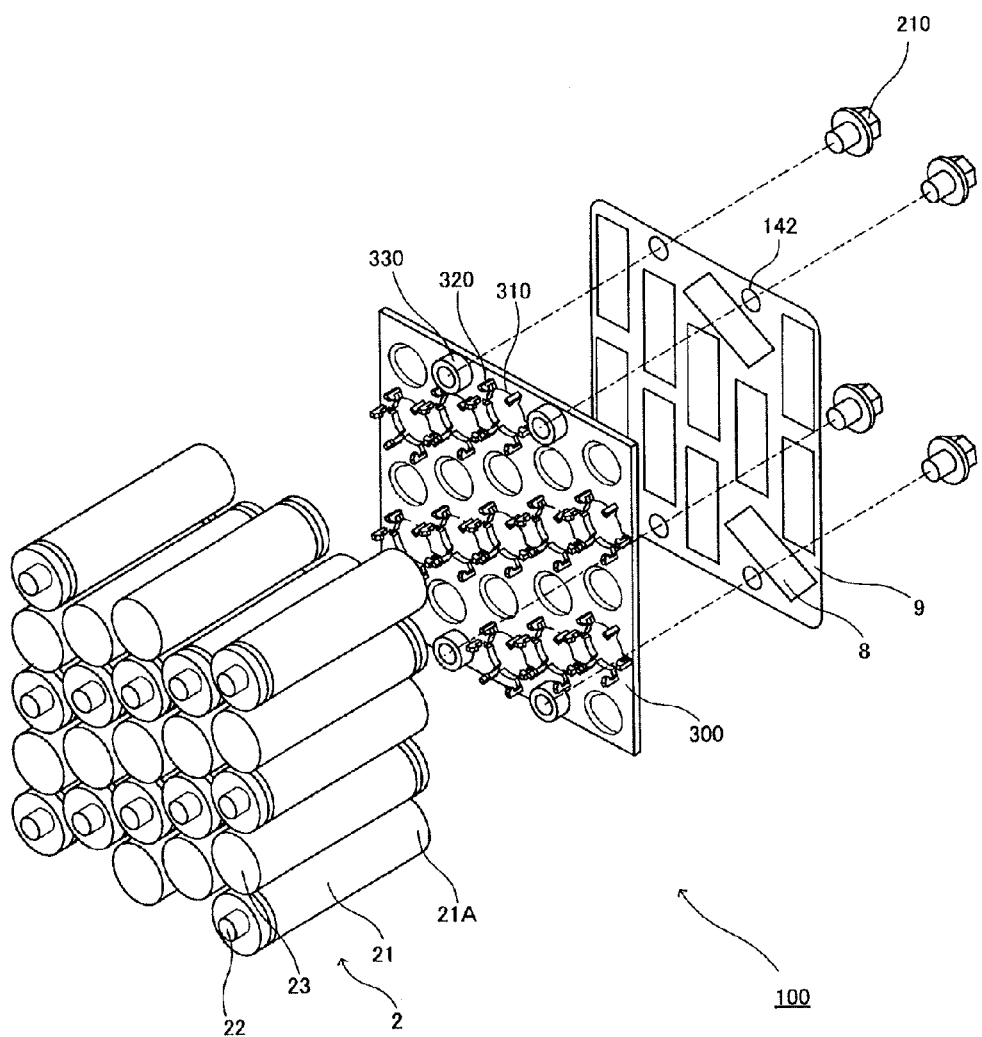
FIG. 10 An exploded perspective view of an assembled battery according to Modification 3.

Although each of the embodiments described above include the plurality of cells 2 connected in parallel, the present invention is not limited thereto and is applicable to the case where the cells 2 are connected in serial. FIG. 10 is an exploded perspective view of an assembled battery according to Modification 3. The components identical to those of Embodiment 1 are designated with the same reference numerals, and detailed description thereof is omitted.

The plurality of cells 2 are arranged such that the positive electrode terminals 22 and the negative electrode terminals 23 alternately have opposite orientations. A fixing plate 300 includes the fixing plate opening portion 310 at the position opposite to each of the cells 2. The fixing plate opening portion 310 is formed in a generally circular shape. Hook portions 320 are formed around the fixing plate opening portion 310 into which the positive electrode terminal 22 is inserted, and no hook portions 320 are formed around the fixing plate opening portion 310 into which the negative electrode terminal 23 is inserted. The configuration of the hook portion 320 is identical to that of the hook portion 32 in Embodiment 1, and description thereof is omitted.

The fixing plate 300 has a plurality of fastening hole portions 330 formed therein at the positions excluding the positions of the fixing plate opening portions 310 and the hook portions 320. Two fastening hole portions 330 are provided at each end portion of the fixing plate 300. The fastening hole portion 330 is set to have a dimension larger than that of the fixing plate 300 in the thickness direction of the fixing plate 300. The fixing plate 300 may be made of an insulating resin. When the fixing plate 300 is made of such a resin, the hook portion 320, the fixing plate opening portion 310 and the like can be formed with injection molding. This can simplify the manufacture of the fixing plate 300 of complicated shape.

Each of bus bars 8 is formed in a rectangular shape and is held on a bus bar holding member 9. The bus bar holding member 9 is made of an insulating resin, and the insulating resin is present between the adjacent bus bars 8. This prevents a short circuit of the cells 2. The bus bar 8 connects the positive electrode terminal 22 and the negative electrode terminal 23 between the adjacent cells 2. The connection may be made by welding. The bus bar holding member 9 has insertion opening portions 142 formed therein for inserting fastening bolts 210.

The insertion opening portion 142 is opposite to the fastening hole portion 330 in the fixing plate 300. The fastening bolt 210 is inserted through the insertion opening portion 142 and is fastened to the fastening hole portion 330 to bring the plurality of cells 2, the fixing plate 300, and the bus bars 8 together. Although FIG. 10 shows only the fixing plate 300, the bus bars 8, and the bus bar holding member 9 placed on the side of one terminal of each cell 2, the fixing plate 300, the bus bars 8, and the bus bar holding member 9 having the same configurations are placed on the side of the other terminal. However, the hook portions 320 are only placed around the fixing plate opening portion 330 into which the positive electrode terminal 22 is inserted. According to the present modification, the same advantages as those of the embodiments described above can be achieved.

The hook portion 320 in Modification 3 may be identical to the hook portion 35 in Embodiment 2. The fixing plate 300 in Modification 3 may be identical to the divided fixing plate 30 in Embodiment 3. In Modification 3, the protruding portion 22A may be formed on the positive electrode terminal 22 of the cell 2 similarly to Modification 1.

Modification 4

Although each of the embodiments described above includes the fixing of the fixing plate 3 to the bus bar 4 by the fastening member 110, the present invention is not limited thereto, and the fixing may be made by using a resin clip or an adhesive. Since the bus bar is fixed to the fixing plate 3 to suppress the relative movement of the cell 2 and the bus bar 4, a poor connection can be avoided.

DESCRIPTION OF THE REFERENCE NUMERALS

1, 100: ASSEMBLED BATTERY, 2: CELL, 3, 30, 300: FIXING PLATE, 4, 8: BUS BAR, 21: BATTERY CASE, 21A: PROTRUDING PORTION, 22: POSITIVE ELECTRODE TERMINAL, 22A: PROTRUDING PORTION, 23: NEGATIVE ELECTRODE TERMINAL, 31, 310: FIXING PLATE OPENING PORTION, 32, 35, 320: HOOK PORTION, 32A: PROTRUSION

The invention claimed is:
1. An assembled battery comprising:
a plurality of cells of cylindrical shape arranged in a plane including a diameter direction, each of the cells including a groove portion extending in a circumferential direction; and
a fixing plate including an engagement portion engaging with each of the groove portions of the cells to fix the plurality of cells,
wherein the cell includes a case of cylindrical shape and a power-generating element housed in the case, and
wherein the groove portion is a protruding portion protruding inward in the case, and a gasket insulating one terminal electrode from the other terminal electrode is located at the protruding portion in the case,
wherein the fixing plate includes a plurality of fixing plate opening portions, each of the plurality of cells being inserted into the plurality of fixing plate opening portions so as to engage the groove portion with the engagement portion,
wherein the engagement portion is an elastically deformable hook portion protruding from a face of the fixing plate, the plurality of cells being placed on the face,
wherein an end of the hook portion engages with the groove portion of the cell and the end of the hook portion is elastically deformed in a radial direction of the cell, so as to hold the cell.

2. The assembled battery according to claim 1, further comprising a bus bar electrically connecting terminal electrodes of adjacent two of the cells, the bus bar being fixed to the fixing plate.

3. The assembled battery according to claim 2, wherein the bus bar is formed in a flat plate shape and includes a plurality of weld portions, each of the terminal electrodes of the plurality of cells being welded to a different one of the weld portions.

4. The assembled battery according to claim 1, wherein the hook portion comprises at least three hook portions along a circumferential direction of the fixing plate opening portion, and the adjacent hook portions in the circumferential direction are disposed at generally equal intervals.

5. A vehicle on which the assembled battery according to claim 1 is mounted.

6. The assembled battery according to claim 3, wherein each of the weld portions is cantilevered at an end portion in a direction of a plane including the bus bar.

7. A vehicle on which the assembled battery according to claim 6 is mounted.

* * * * *